United States Patent [19]

Murphy

[11] Patent Number: 5,404,834
[45] Date of Patent: Apr. 11, 1995

[54] TEMPERATURE INDICATING DEVICE

[75] Inventor: Andrew P. Murphy, Littleton, Colo.

[73] Assignee: The United States of America as represented by the Secretary of the Interior, Washington, D.C.

[21] Appl. No.: 31,448

[22] Filed: Mar. 15, 1993

[51] Int. Cl.⁶ ............................................. G01K 5/32
[52] U.S. Cl. .................................... 116/216; 374/106; 374/201
[58] Field of Search ............... 116/216, 218, 219, 220; 374/104, 105, 106, 190, 201

[56] References Cited

U.S. PATENT DOCUMENTS

| | | | |
|---|---|---|---|
| 3,555,906 | 1/1971 | Ayres | 374/105 |
| 3,688,582 | 9/1972 | Gradishar | 374/105 |
| 3,745,831 | 7/1973 | Rothstein et al. | 374/105 |
| 3,895,523 | 7/1975 | Nollen | 116/220 X |
| 4,120,818 | 10/1978 | Swindells et al. | 116/219 X |
| 4,145,918 | 3/1979 | Couch et al. | 116/219 X |
| 4,191,125 | 3/1980 | Johnson | 116/219 |
| 4,647,224 | 3/1987 | Holm et al. | 374/106 X |
| 4,739,835 | 4/1988 | Polan et al. | 116/216 X |
| 5,153,036 | 10/1992 | Sugisawa et al. | 116/216 X |
| 5,215,378 | 6/1993 | Manske | 374/106 X |

FOREIGN PATENT DOCUMENTS 8204478 12/1982 WIPO .................... 374/106

*Primary Examiner*—William A. Cuchlinski, Jr.
*Assistant Examiner*—John L. Beres
*Attorney, Agent, or Firm*—E. Philip Koltos

[57] ABSTRACT

An indicator device indicates that the temperature in a location in which the device is placed has exceeded a predetermined maximum temperature value. The he device includes a liquid receptacle comprising frangible bulb portion and an integral capillary portion and an absorbent card to which said receptacle is secured. The bulb portion contains a first liquid and the capillary portion contains a second liquid which is insoluble in said first liquid. The second liquid has a freezing point higher then that of the first liquid and close to but greater than the predetermined temperature value so that when the device is placed in a location which has temperature lower than the predetermined value and in which the predetermined value is to be maintained, the second liquid freezes in the capillary tube and prevents the first liquid from expanding. Thus, if the temperature in the monitored location increases such that expansion of the first liquid causes breakage of the frangible bulb and the release of the first liquid that liquid will cause staining of the absorbent card to provide an indication that the predetermined value has been exceeded within the location.

20 Claims, 1 Drawing Sheet

TEMPERATURE INDICATING DEVICE

FIELD OF THE INVENTION

The invention relates to a device for providing and indication that the temperature within an area in which the device is located has been exceeded.

BACKGROUND OF THE INVENTION

There are a number of different devices available that indicate when a predetermined or rated temperature has been exceeded. These include the following: (1) non-reversible labels with an indicator dot that changes color, e.g., turns black, at a rated temperature; (2) temperature indicating tabs, crayons, lacquers and pellets that indicate a temperature increase by melting; (3) irreversible labels and monitors that change color (e.g., turn black) at the temperature rating and also register the temperature history of the area; (4) melting point standards that melt at precise temperatures; and (5) reversible labels and liquid crystal thermometers that behave like conventional thermometers to provide the present temperature of an object.

A serious disadvantage of most of these devices is that the temperature setting at which the temperature indicator changes color is above room temperature, i.e., the devices do not operate below room temperature. The explanation for this temperature limitation may be that such devices cannot be manufactured for technical reasons or that it is considered impractical to do so because of the inconvenience of having to maintain the devices below room temperature, e.g., in a refrigerator or freezer until ready to use. Of course, thermometers will operate below room temperature but they do not provide a permanent record of a maximum temperature being exceeded and thus will not alert a user after the fact.

In addition the devices discussed above, there are a number of other devices which provide temperature indications, including devices which operate below room temperature. Examples of these include the devices disclosed in the following U.S. Pat. Nos.: 4,145,918 (Couch et al); 4,134,359 (Redpath); 4,120,818 (Swindells et al); 4,038,936 (Kessler); 3,702,077 (Szabo); 3,545,400 (Smith); 3,414,415 (Broad, Jr.); 2,896,568 (Pryor et al); 2,560,537 (Andersen); 2,823,131 (Power).

Briefly considering these patents, the Couch et al patent discloses a freeze and thaw indicator which relies on the expansion characteristics of a liquid (water) when the liquid changes from the liquid state to the solid state. The indicator includes an ampul which breaks when the water freezes. During a subsequent thawing, water flows on indicator paper to cause ink thereon to wick up. The Redpath patent discloses a temperature indicator device wherein melting of a frozen indicator will result in the indicator flowing through a barrier and discoloring a material to indicate that proper storage conditions have not been maintained. The Swindells et al patent discloses an irreversible warmup indicator wherein melting of a liquid after freezing thereof causes the liquid to escape through an orifice to contact indicating papers and provide dying of the paper. The Kessler patent discloses a condition change indicator wherein two communicating chambers contain distinctly different substances. After arming, either the frozen state of the fluid in the lower chamber or an unmelted plug between the chambers permits mixing of the substances until the liquid change to be indicated has taken place. The remaining patents disclose other devices for indicating defrosting, thawing or other temperature changes.

SUMMARY OF THE INVENTION

In accordance with the invention, an improved device is provided for producing ah indication or record of whether a maximum or rated temperature has been exceeded. The device of the invention is simple, disposable and small in size (on the order of one inch by one-half inch is a specific non-limiting example).

According to a preferred embodiment thereof, the invention comprises an indicator device for indicating that the temperature in a location in which the device is placed has exceeded a predetermined maximum value, the device comprising: a liquid receptacle including frangible portion containing a first liquid and a second liquid located within a further portion of the receptacle and being insoluble in the first liquid. The second liquid has a freezing point higher than that of said first liquid and somewhat greater than the predetermined temperature value. Thus, when the device is placed in a location which has temperature lower than the predetermined value (and in which the predetermined value is to be maintained), the second liquid freezes and prevents the first liquid from expanding, whereby if the temperature in that location increases such that expansion of the first liquid causes breakage of the frangible portion of the receptacle, an indication is provided that the predetermined temperature value has been exceeded within that location.

Preferably, the frangible portion comprises a frangible bulb made of glass, thin plastic or the like and the further portion comprises a capillary tube made of a like material connected to and opening into the bulb.

In one embodiment, the capillary tube is formed in a solid member secured to the bulb.

In a second embodiment, the device includes a tubular enclosure which is secured to the bulb so as to enclose the capillary tube and which contains the second liquid, and the capillary tube is initially evacuated and includes a break line which, when broken, enables said second liquid from said tubular enclosure to be drawn by capillary action into said capillary tube to arm the device. Preferably, the tubular enclosure comprises a heat shrunk plastic tube.

Advantageously, the device includes a backing portion of a first color in at least the area of said glass bulb and said first liquid is of further contrasting color so that staining of said backing portion of said second color by said first liquid of said first color provides said indication.

In one advantageous implementation, the first liquid includes a dye. In a specific advantageous example, the first liquid comprises hexane dyed with carotene. In a further specific advantageous example, the second liquid comprises polyethylene glycol. In an advantageous example used with the second embodiment described above, the first liquid comprises a mineral oil and the second liquid comprises polyethylene glycol.

Preferably, the device includes a card of blotting paper or the like on which the receptacle is mounted. Advantageously, the device further comprises a protective plastic cover member which is secured to said card and in which the receptacle is located so that said receptacle is protected from breakage by said cover member.

Other features and advantages of the invention will be set forth in, or apparent from, the following detailed description of preferred embodiments of the invention.

DESCRIPTION OF THE PREFERRED EMBODIMENTS

Figure 1:
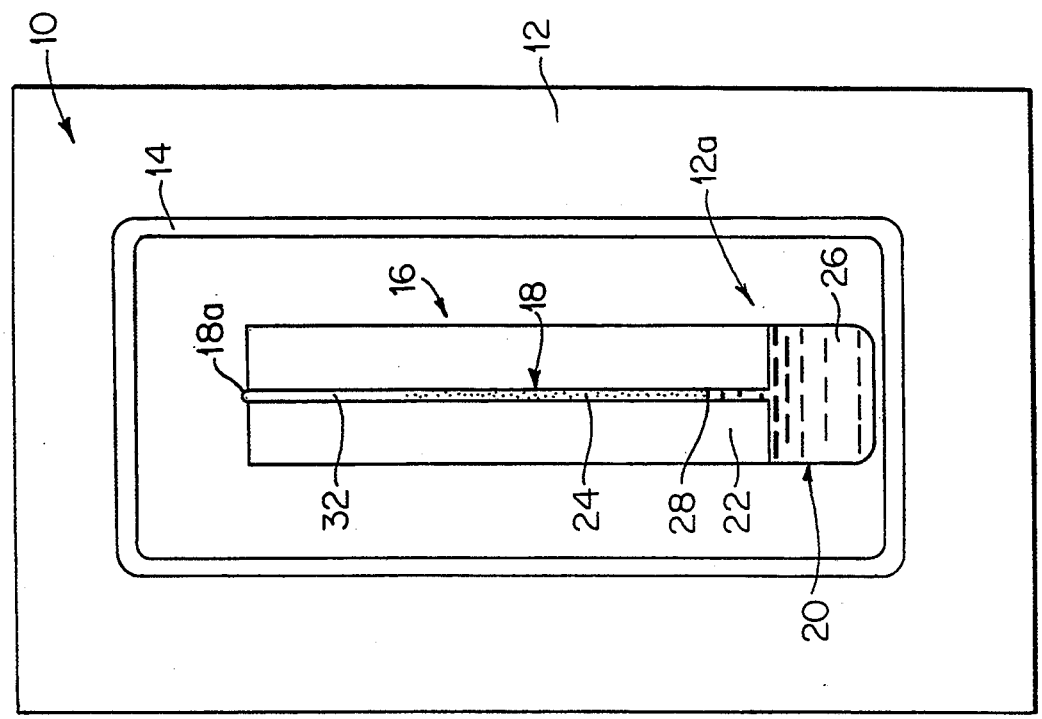
FIG. 1 is a plan view of a temperature indicating device in accordance with first embodiment of the invention.

Referring to FIG. 1, a first preferred embodiment of the temperature checking or monitoring device of the invention is shown. The device, which is generally denoted 10, includes a blotter paper card 12 which is preferably white in color to provide a good color contrast and on which is mounted a protective plastic bubble or cover 14.

A glass indicator assembly 16 is disposed within and protected by bubble 14 and comprises a thin or fine capillary 18 which terminates in a thin walled glass bulb 20. The capillary 18 is provided within a solid glass wall 22 and contains a second liquid indicated by stippling at 24. A first liquid 26, which is not soluble in liquid 24, is contained within bulb 20 and partly within capillary tube 18 so that interface is provided at 28 between the liquids 24 and 26. An empty area or air space 32 is provided above liquid 24, i.e., between the liquid 24 and the sealed off end 18a of capillary tube 18. The liquid 24 is chosen to have a freezing point somewhat greater than the maximum temperature to be withstood, i.e., the temperature that is not to be exceeded.

In operation, when the device is initially at room temperature, changes in this temperature cause the liquids 24 and 26 to move up and down in the thin capillary 18 in the manner of the liquid in a thermometer. In actual use, the device is placed in a cold area the temperature in which is not to exceed a predetermined value. As the temperature of the device 10 drops, the liquid 24 freezes. Because, as stated, the freezing point liquid 24 is chosen to be somewhat greater than the maximum temperature not to be exceeded, if the area in which the device 10 is located begins to warmup, liquid 26 will attempt to expand but will be prevented from doing so by the frozen liquid 24. Accordingly, the expanding liquid 26 will break the thin glass bulb 20 and will stain blotter 12 in the general area 12a within cover 14. This alerts a user of the device 10 that the maximum permitted temperature has been exceeded. It will be understood, of course, that the stain remains even if the temperature returns to a value below the maximum permissible temperature and thus a permanent record is provided of that temperature being exceeded.

In a specific non-limiting example, a glass indicator assembly corresponding to assembly 16 of FIG. 1 was used and a syringe containing hexane dyed with carotene (corresponding to fluid 26) was used to fill the bulb 20 and the capillary 18 up to the level indicated at 28 in FIG. 1.

A syringe containing polyethylene glycol which has a freezing point of about 4° to 8° C. and corresponding to fluid 24, was then used to fill capillary 18 about half way to the top. The glass tube defining capillary 18 was then sealed off at the top, i.e., at 18a, using a simple flame to provide sealing.

The device 10 was thereafter placed in a refrigerator operating at a temperature near 4° C. After an hour, the device 10 was removed from the refrigerator and placed on a white tissue (which corresponds to card 12 of the device of FIG. 1). It was observed that the polyethylene glycol (liquid 24) was frozen (having assumed a white rather than a clear color). It was thereafter observed that when the device warms to room temperature (about 23° C.) the glass vial or bulb 20 breaks and stains the white tissue orange.

Figure 2:
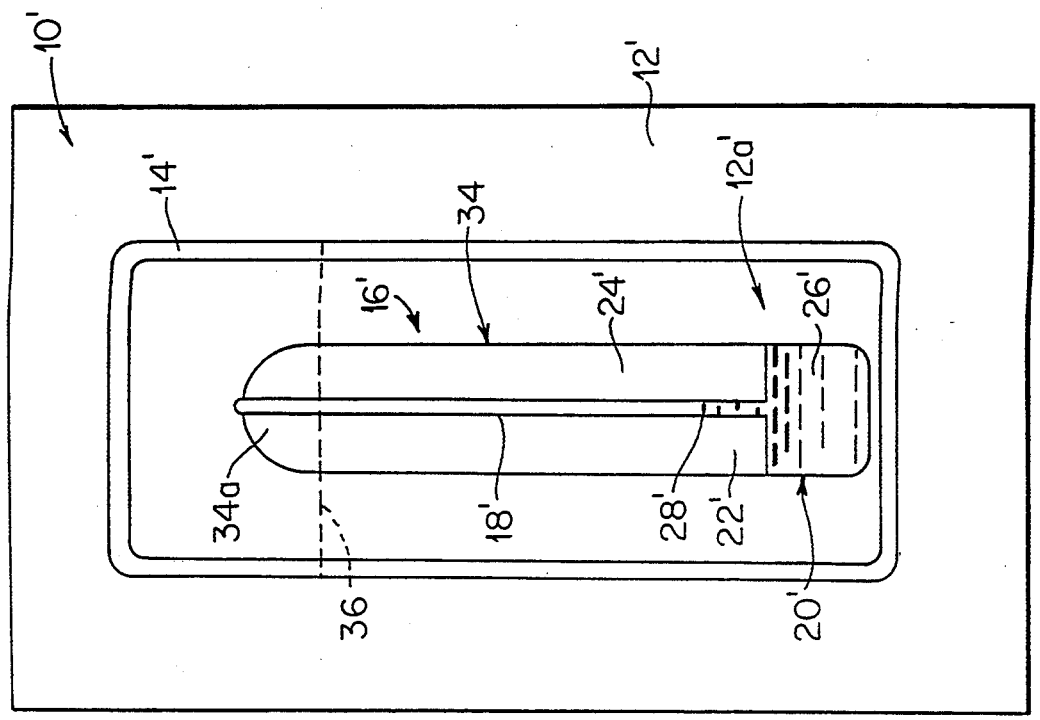
FIG. 2 is a plan view, similar to that of FIG. 1, of a temperature indicating device in accordance with a second embodiment of the invention.

Referring to FIG. 2, a second embodiment of the invention is shown. This embodiment is similar to that of FIG. 1 and like elements have been given the same reference numerals with primes attached. In this embodiment, heat shrinkable plastic tubing 34 is filled with a suitable liquid 24' (e.g., polyethylene glycol) and shrunk around the bulb 20' and an evacuated capillary tube 18' and terminates in a dome shaped portion 34a at the top. A second low volatility liquid 26' (e.g., mineral oil) is placed in bulb 20' and extends part way up capillary tube 18' to point 28'. A break line is provided at 36 somewhat near the top of tubing 34 (although this location is critical) such that when the card 12' is bent along line 36 the capillary tube 18' breaks. To this end, capillary tube 18' can be scored to break easily at this line 36.

In operation, as the room temperature changes, the liquid 26' will move up or down the capillary tube 18' depending on the change. If the device freezes, the glass assembly 16' does not break. In order to activate the device 10' for use, the card 14' is bent along break line 36, thereby breaking the capillary tube 18' near the upper end thereof and thus allowing the liquid 24' to be drawn down into the capillary tube 18' close to or in contact with liquid 26', i.e., in the neighborhood of surface or point 28'. At this stage, the device is similar to that of FIG. 1, i.e., capillary tube 18' contains liquids 24' and 26' and the overall operation is basically the same as that described above. In this regard, when the device 10' is placed in a refrigerator or like location, the liquid 24' in tube 18' will freeze and bulb 20' will break if the temperature rises at a later time due to the expansion of liquid 26'.

Considering the invention more generally, although the specific liquids and dyes set forth produce good results, there are, of course, other liquids can be used and in general, there are a number of other candidates. Basically, the other requirements are that the liquids and dyes be nontoxic, and preferably inexpensive and neither the dye-stained liquid or dye (liquid 26 or 26') should be soluble in the other liquid (liquid 24 or 24'). It is also noted that various grades of polyethylene glycol (one of the liquids used in the foregoing examples) can be used to accommodate the need for different freezing points.

The plastic and glass parts (or either) can be white in color so as to enhance the visual effect of the staining dye.

The accuracy of the device of the invention can be adjusted by scoring the glass bulb (20 or 20') with depth of the score being directly related to how easy the bulb breaks, adjusting the thickness of the bulb (for the same purpose), and judiciously choosing either of the two liquids. It is noted that a narrow molecular weight range of polyethylene glycol can be used which has a much more accurate or limited freezing point range than that set forth above.

Although accuracy can be important in some applications, it should be understood that this is not the case for many applications. For example, a water sample which is to be maintained at 4° C. to prevent biological growth will not change chemically if the temperature of the sample increases above this limit by a few degrees for a short period, e.g., less than about an hour or so, in contrast to a situation where the sample temperature were to increase to yet a higher level for several hours so that resultant biological growth might change the chemical constituents.

Although the present invention has been described relative to specific exemplary embodiments thereof, it will be understood by those skilled in the art that variations and modifications can be effected in these exemplary embodiments without departing from the scope and spirit of the invention.

What is claimed is:

1. An indicator device for indicating that the temperature in a location in which the device is placed has exceeded a predetermined maximum temperature value, said device comprising: a liquid receptacle including a first portion containing a first liquid a further portion containing a second liquid insoluble in said first liquid,; said second liquid having a freezing point higher than that of said first liquid and somewhat greater than the predetermined temperature value so that when said device is placed in a location which has temperature lower than said predetermined value and in which said predetermined value is to be maintained, said second liquid freezes and prevents said first liquid from expanding, said first portion comprising said first liquid so that when the temperature in said location increases such that expansion of said first liquid causes breakage of said frangible means of said receptacle, an indication is provided that said predetermined value has been exceeded within said location. n of 2. A device as claimed in claim 1, wherein said frangible portion comprises a frangible bulb and said further portion comprises a capillary tube connected to and opening into said bulb.

3. A device as claimed in claim 2, wherein said capillary tube is formed in a solid member secured to said bulb.

4. A device as claimed in claim 2, wherein said device includes a tubular enclosure secured to said bulb so as to enclose the capillary tube and containing said second liquid, and wherein said capillary tube is initially evacuated and includes a break line which, when broken, enables said second liquid from said tubular enclosure to be drawn by capillary action into said capillary tube to arm the device.

5. A device as claimed in claim 4, wherein said tubular enclosure comprises a heat shrunk plastic tube.

6. A device as claimed in claim 2, wherein said device includes a backing portion of a first color in at least the area of said glass bulb and of a material capable of being stained by said first liquid, and said first liquid is of a further, contrasting color so that staining of said backing portion of said first color by said first liquid of said contrasting color provides said indication.

7. A device as claimed in claim 6, wherein said first liquid comprises hexane dyed with carotene.

8. A device as claimed in claim 7, wherein said second liquid comprises polyethylene glycol.

9. A device as claimed in claim 4, wherein said first liquid comprises a mineral oil and said second liquid comprises polyethylene glycol.

10. A device as claimed in claim 1, wherein said device includes a card of blotting paper on which said receptacle is mounted.

11. A device as claimed in claim 9, further comprising a protective plastic cover member which is secured to said card and in which said receptacle is located so that said receptacle is protected from breakage by said cover member.

12. A device as claimed in claim 1 wherein said receptacle comprises an integral glass bulb and capillary tube, said glass bulb comprising said frangible portion and said capillary tube comprising said further portion, said first liquid filling said bulb and a part of said capillary tube, and said second liquid filling a further part of said capillary tube leaving an air space at the top of the capillary tube.

13. An indicator device for indicating that the temperature in a location in which the device is placed has exceeded a predetermined maximum temperature value, said device comprising: a liquid receptacle comprising a bulb portion and an integral capillary portion connected to and in fluid communication with said bulb portion, and a stainable absorbent card to which said receptacle is secured, said bulb portion containing means, comprising a first liquid, for, when released from said bulb portion, staining said absorbent card, and said capillary portion containing a second liquid which is insoluble in said first liquid; said second liquid having a freezing point higher than that of said first liquid and close to but greater than the predetermined temperature value so that when said device is placed in a location which has temperature lower than said predetermined value and in which said predetermined value is to be maintained, said second liquid freezes in said capillary tube and prevents said first liquid from expanding, said bulb portion comprising frangible means for breaking in response to expansion of said first liquid to release said first liquid therefrom so that when the temperature in said location increases so that expansion of said first liquid causes breakage of said frangible means of said receptacle and the release of said first liquid therefrom, said first liquid causes staining of said absorbent card to provide an indication that said predetermined value has been exceeded with said location.

14. A device as claimed in claim 13, wherein said capillary tube is formed in a solid member secured to said frangible bulb.

15. A device as claimed in claim 13, wherein said device includes a tubular heat shrunk enclosure secured to said bulb so as to enclose the capillary tube and containing said second liquid, and wherein said capillary tube is initially evacuated and includes a break line which, when broken, enables said second liquid from said tubular enclosure to be drawn by capillary action into said capillary tube to arm the device.

16. A device as claimed in claim 13, wherein said first liquid includes a dye.

17. A device as claimed in claim 16, wherein said first liquid comprises hexane dyed with carotene and said second liquid comprises polyethylene glycol.

18. A device as claimed in claim 15, wherein said first liquid comprises a mineral oil and said second liquid comprises polyethylene glycol.

19. A device as claimed in claim 13, further comprising a protective plastic cover member which is secured to said card and in which said receptacle is located so that said receptacle is protected from breakage by said cover member.

20. An indicator device for indicating that the temperature in a location in which the device is placed has exceeded a predetermined maximum temperature value, said device comprising: a liquid receptacle including a frangible portion containing a first liquid; a second liquid located within a further portion of said receptacle and being insoluble in said first liquid; said second liquid having a freezing point higher than that of said first liquid and somewhat greater than the predetermined temperature value so that when said device is placed in a location which has temperature lower than said predetermined value and in which said predetermined value is to be maintained, said second liquid freezes and prevents said first liquid from expanding whereby if the temperature in said location increases such that expansion of said first liquid causes breakage of said frangible portion of said receptacle, an indication is provided that said predetermined value has been exceeded within said location, said device including a tubular enclosure secured to said bulb so as to enclose the capillary tube and containing said second liquid, said capillary tube being initially evacuated and including a break line which, when broken, enables the second liquid from the tubular enclosure to be drawn by capillary action into said capillary tube to arm the device.

* * * * *